(12) United States Patent
Farber

(10) Patent No.: US 8,573,456 B2
(45) Date of Patent: Nov. 5, 2013

(54) VEHICLE MOUNTED BICYCLE CARRIER

(75) Inventor: Robert Farber, Montreal (CA)

(73) Assignee: Swiss Cargo Industries S.A. Inc., St. Jean, Quebec (CA)

( * ) Notice: Subject to any disclaimer, the term of this patent is extended or adjusted under 35 U.S.C. 154(b) by 85 days.

(21) Appl. No.: 13/286,666

(22) Filed: Nov. 1, 2011

(65) Prior Publication Data

US 2013/0105534 A1    May 2, 2013

(51) Int. Cl.
*B60R 9/10*    (2006.01)

(52) U.S. Cl.
USPC ............ 224/504; 224/924; 224/314; 224/502

(58) Field of Classification Search
USPC ......... 224/497, 502, 493, 532, 329, 512, 309, 224/504, 924, 314, 321; 410/3; 211/17–22; D12/407, 408; 482/107; 279/44
See application file for complete search history.

(56) References Cited

U.S. PATENT DOCUMENTS

| | | | | |
|---|---|---|---|---|
| 1,645,457 | A | * | 10/1927 | Schall ........................... 482/107 |
| 4,830,250 | A | | 5/1989 | Newbold et al. |
| 5,135,145 | A | * | 8/1992 | Hannes et al. ................ 224/493 |
| 5,495,970 | A | * | 3/1996 | Pedrini ......................... 224/314 |
| 8,028,878 | B1 | * | 10/2011 | Pedrini ......................... 224/495 |
| 2002/0117524 | A1 | * | 8/2002 | Jeong ............................ 224/314 |
| 2006/0138186 | A1 | * | 6/2006 | Pedrini ......................... 224/497 |

* cited by examiner

*Primary Examiner* — Nathan J Newhouse
*Assistant Examiner* — Phillip Schmidt
(74) *Attorney, Agent, or Firm* — Husch Blackwell LLP

(57) ABSTRACT

A vehicle mounted bicycle carrier having an elongated shaft with a splined profile along at least a portion of its length, a plurality of rotatable members removably mounted to the shaft and a plurality of collar assemblies removably mounted to the shaft. The plurality of members feature a first member having at least one arm with an aperture defined by an edge having a grooved profile in cross-section that is suitable for mating with the portion of the shaft having the splined profile. The plurality of members also having additional members that are suitable for rotating about the splined portion of the shaft. The plurality of members having a plurality of interlocking teeth that facilitate in securing the members together at the desired angular relationship.

24 Claims, 3 Drawing Sheets

VEHICLE MOUNTED BICYCLE CARRIER

FIELD OF THE INVENTION

The present disclosure is directed generally to a bicycle carrier and more specifically to a vehicle mounted bicycle carrier having multiple support members suitable for being rotationally mounted in cantilever fashion to a shaft having a splined outer profile.

BACKGROUND OF THE INVENTION

This concerns transporting one or more bicycles via an automobile or other type of vehicle. Typically, however, the interiors of some vehicles do not have sufficient size to accommodate one or more bicycles. Accordingly, there have been many efforts directed toward providing various devices that can allow one or more bicycles to be transported via an exterior portion of a vehicle. The rear portion of a vehicle's exterior, such as for example the trunk or rear hatch, has been a particularly common area to attach such devices. Bicycle carriers affixed to such an area typically include one or more support arms extending in a rearward direction away from the back of the vehicle and further have been known to include support straps or clips that can secure the bicycles to the carrier and/or further secure the carrier to the vehicle.

However, as there are many different makes and models of vehicles in use, there is much variation with respect to the size, shape and/or features at or around the rear exterior of various automobiles. It is therefore advantageous to have a bicycle carrier that can be easily adjusted so that it can be secured to the rear portion of a variety of different kinds of vehicles. Although certain such devices are known, most do not provide for acute or precise adjustment, are typically clumsy or flimsy in design, or are difficult to assemble, adjust or disassemble. Indeed, often times, support arms of such bicycle carriers have be manually removed or separated, reoriented and then remounted in order to adjust the arms of the carrier to the desired position. Thus, it is advantageous to provide a durable vehicle mounted bicycle carrier having support arms that can be precisely and easily adjusted without having to be removed or separated from the carrier.

SUMMARY OF THE INVENTION

Embodiments of the subject disclosure are generally directed to a bicycle carrier comprising an elongated shaft having an outer surface featuring a splined profile along at least a portion of its length, a plurality of articulating support members removably mounted to the shaft in cantilever fashion and a plurality of collar assemblies removably mounted to the shaft to hold the support members in a fixed position along the length of the shaft. The plurality of support members include a first support member having at least one arm with opposing first and second sides and a proximal end. The arm of the first support member features an aperture defined by an edge having a grooved profile in cross-section which is suitable for receiving the shaft and for mating with the portion of the shaft having the splined profile. The arm of the first support member additionally features a plurality of teeth extending axially from both the opposing first and second sides.

The carrier features additional support members that have at least one arm that has a second type of aperture at its proximal end that is suitable for receiving the shaft but that enables the arm to rotate about the splined portion of the shaft. The proximal end of the arms of the additional support members additionally have a plurality of teeth axially extending from at least one of the opposing first or second sides. The collar assemblies can feature an outside surface, a body, a central aperture for receiving the shaft, and a fastener extending through the body from the outside surface into the central aperture. The collar assemblies can slide along the length of the shaft and preferably be removed from the ends of the shaft.

According to various embodiments, one of the support members is suitable for accommodating at least one bicycle, whereas the remaining support members are suitable for mounting the carrier to the rear portion of a vehicle. Unlike prior devices, elements of the subject invention allow a user to manipulate and discretely adjust the support members to various positions to accommodate a variety of vehicles without having to entirely remove the support arms from the shaft. Moreover, according to various embodiments, at least some of the arms of certain support members are substantially identical and can be exchanged with one another. Such a configuration facilitates easy assembly, installation, adjustment and storage. The subject carrier is further made of durable material that is resilient to harsh weather or abusive treatment.

Further objects, features and advantages of the present invention will be apparent from the following description and the appended claims when taken in conjunction with the accompanying drawings.

BRIEF DESCRIPTION OF THE DRAWINGS

In the following detailed description, reference is made to the following views of the drawing, in which like reference numerals refer to like components, and in which.

DETAILED DESCRIPTION

Figure 1:
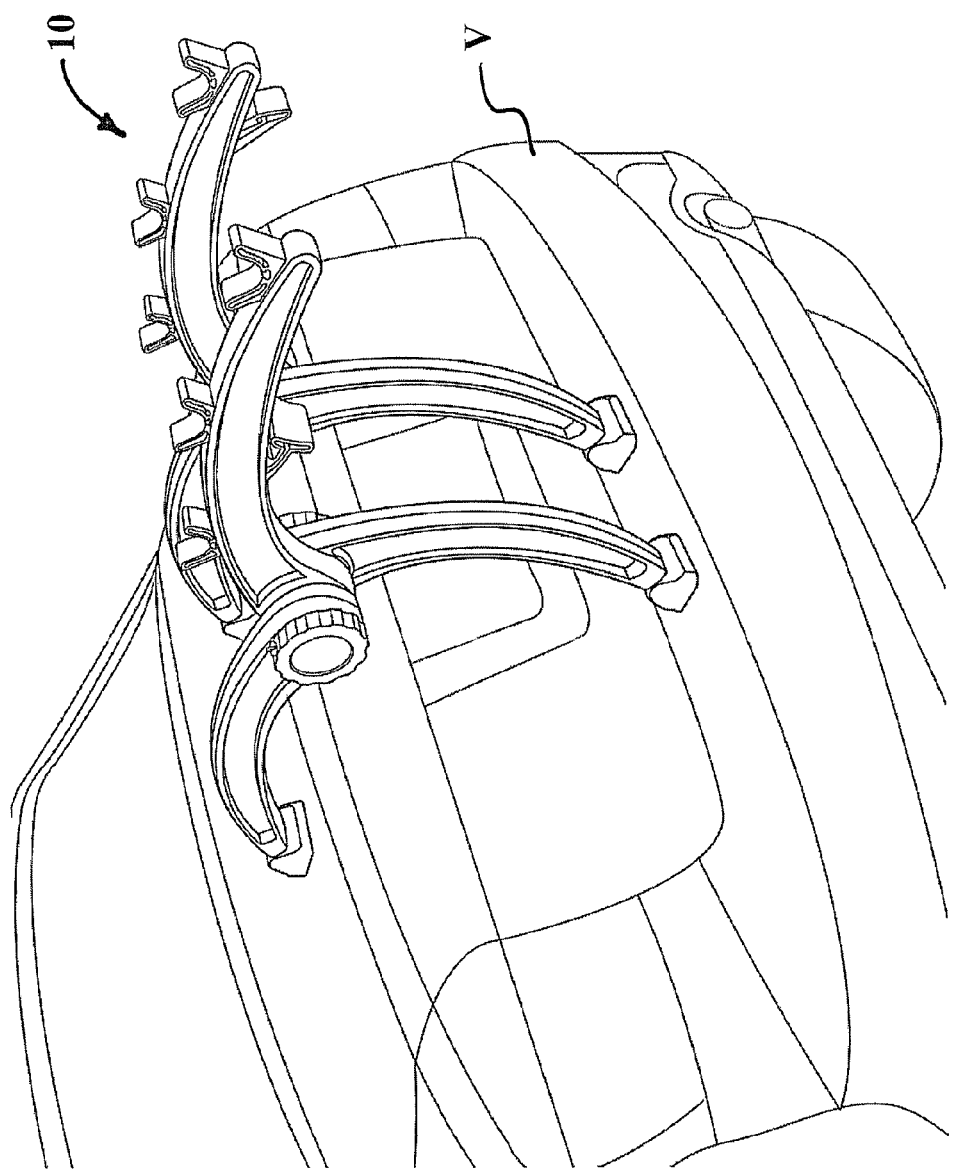
FIG. 1 is a perspective partial view of the rear portion of a motor vehicle provided with a bicycle carrier according to one embodiment of the present disclosure.

While the present invention is susceptible of embodiment in various forms, there is shown in the drawings a number of presently preferred embodiments that are discussed in greater detail hereafter. It should be understood that the present disclosure is to be considered as an exemplification of the present invention and is not intended to limit the invention to the specific embodiments illustrated. It should be further understood that the title of this section of this application ("Detailed Description") relates to a requirement of the United States Patent Office and should not be found to limit the subject matter disclosed herein.

Figure 2:
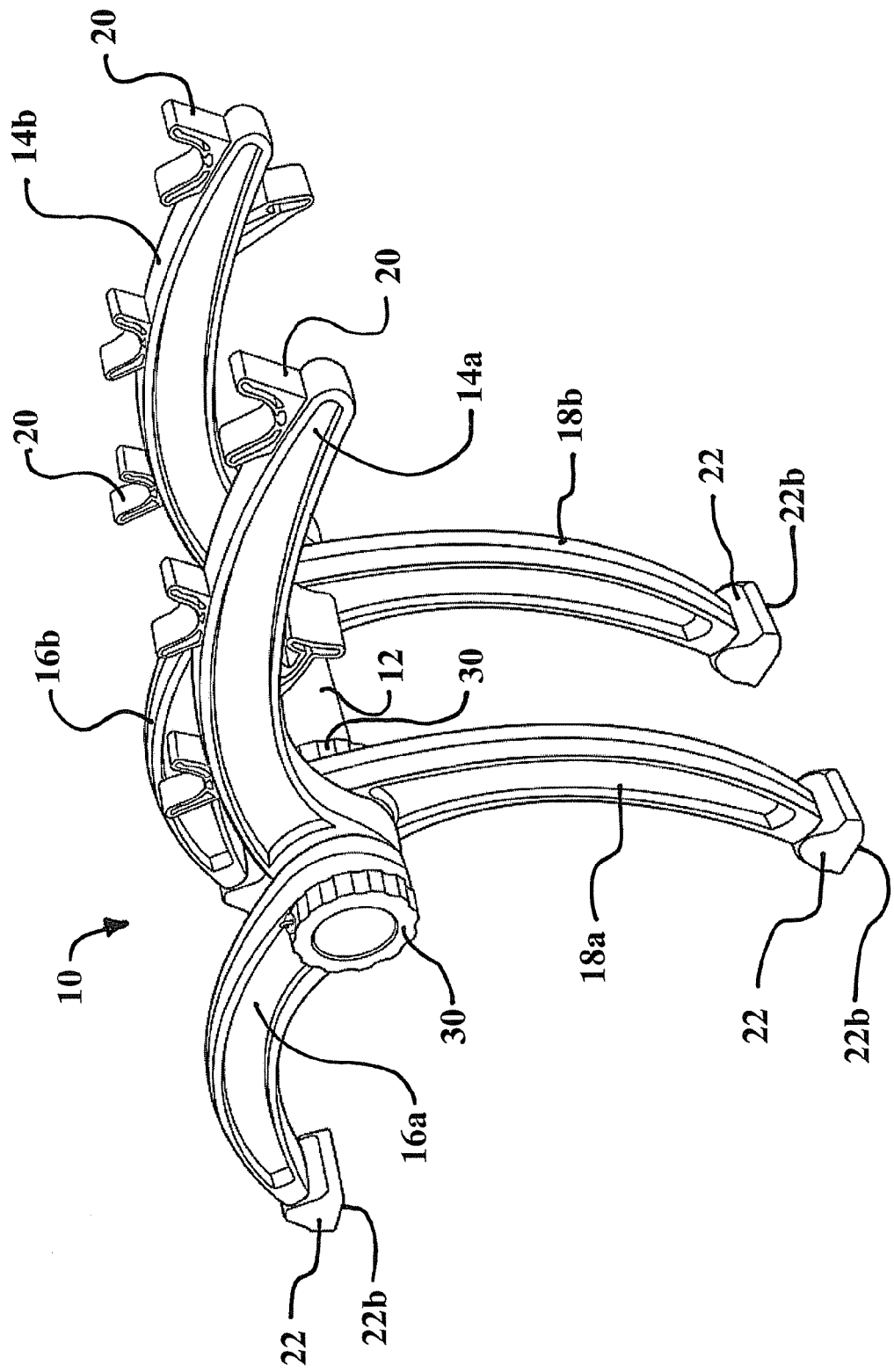
FIG. 2 is a perspective view of the bicycle carrier shown in FIG. 1.
Figure 3:
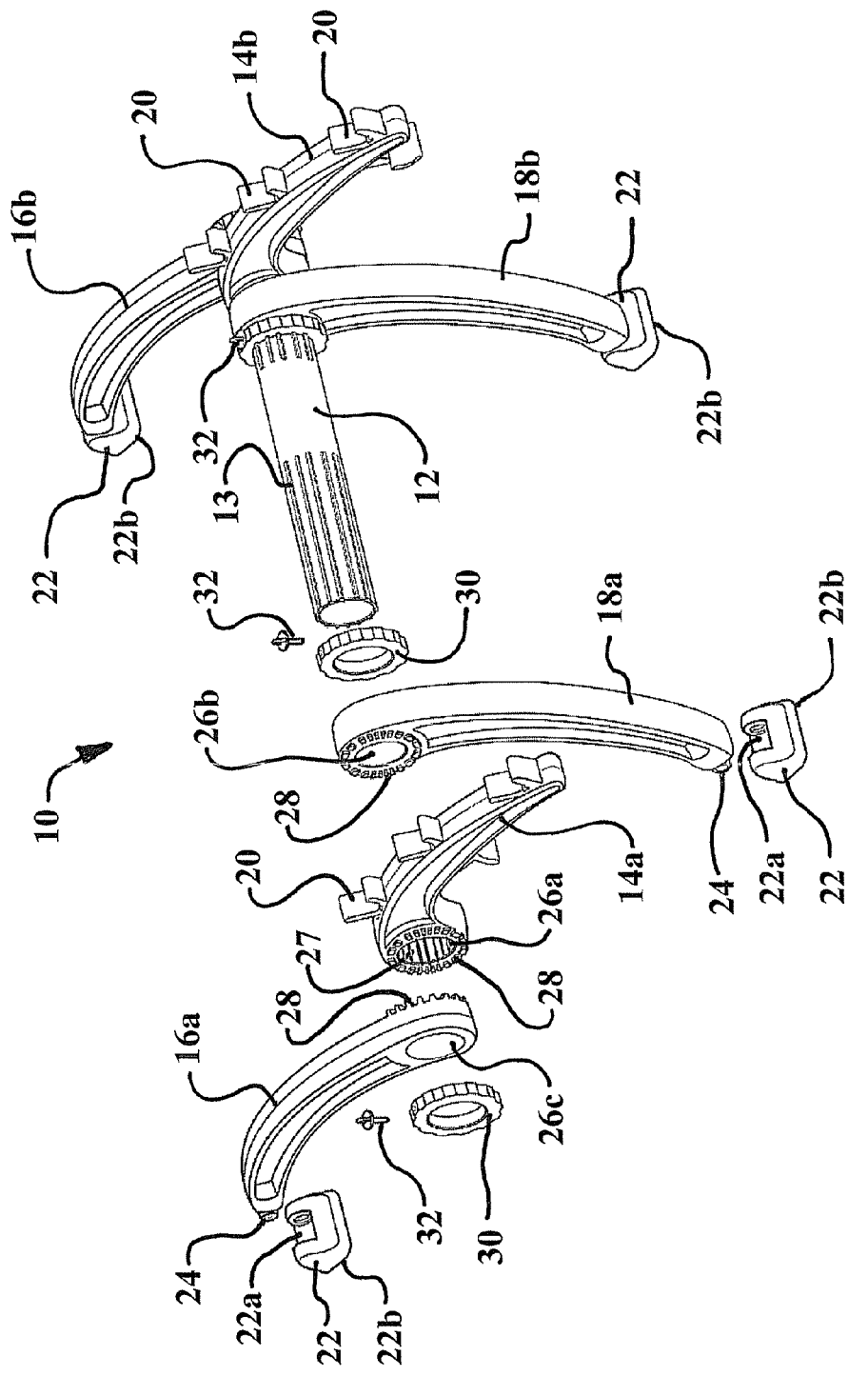
FIG. 3 is a perspective view of the bicycle carrier shown in FIGS. 1 and 2 partially disassembled.

Referring now to the figures, FIGS. 1-3 show one embodiment of a bicycle carrier 10 according to the present disclosure. As shown in the figures, carrier 10 features an elongated shaft 12 having an outer surface with a splined profile 13 along at least part of its length. As shown, shaft 12 is in use is generally oriented horizontally. The carrier 10 can be comprised of metal, plastic or any other type of rigid material of suitable strength and durability to sufficiently bear the weight of one or more bicycles. As shown in FIG. 3, the splined profile 13 along at least a potion of the shaft 12 is comprised of a plurality of individual splines projecting substantially radially away from the center of the shaft 12 and extending longitudinally along at least a portion of the shaft 12. According to various embodiments, the splines can be spaced a uniform distance from one another or can be spaced apart by varying distances. The splines can circumscribe the entire perimeter of the profile of the shaft 12, or they can be displaced at discrete areas around the perimeter. Although FIGS. 1-3 show the shaft 12 having a cylindrical configuration of a particular size, the shaft 12 can be alternatively shaped or sized without departing from the novel scope of the present invention.

As best seen in FIGS. 2 and 3, carrier 10 has multiple support members 14, 16, 18 which can be fixed in user-selected angular positions to extend away from the shaft 12. Although the figures show each support member 14, 16, 18 being comprised of two individual arms 14a, 14b; 16a, 16b; 18a, 18b; it is understood that any or all of the support members 14, 16, 18 can be comprised of a single arm or more than two individual arms. In the embodiment shown in FIGS. 1-3, the carrier 10 features one support member 14 comprised of two individual matching arms 14a, 14b suitable for supporting at least one bicycle, and second 16 and third 18 support members each having two individual matching arms 16a, 16b; 18a, 18b suitable for supporting the carrier to the vehicle V. It is understood that additional support members having additional arms can be provided without departing from the novel scope of the present invention. As shown in the figures, the arms 16a, 16b; 18a, 18b of the second and third support members 16, 18 can have an arcuate shape along their length. In addition, it should be understood that the length of the arms of the second and third support members 16, 18 can be substantially the same length or can have different lengths. However, it is generally preferable that each of the arms 16a, 16b of the second member 16 be of equal length to one another and that the arms 18a, 18b of the third support member 18 be of equal length to one another. In addition, although not shown, the carrier can also feature a plurality of straps for securing the carrier to the vehicle V.

As shown in the figures, the arms 14a, 14b of one support member 14 have at least one mount assembly 20 suitable for supporting a bicycle. FIGS. 1-3 show one embodiment in which the arms 14a, 14b of one support member 14 each feature three cradles or mount assemblies 20 each having a profile with a generally V-shaped configuration suitable for cradling the frame of a bicycle. As shown in the figures, the mount assemblies 20 can be affixed to arms 14a, 14b preferably, though not necessarily, to the top surface thereof. Thus, each arm may support a plurality of assemblies 20. Preferably, an assembly 20 on one arm will align with another assembly 20 on another arm, and each arm will have a sequence of assemblies 20 thereon, located at different distances away from the shaft 12. Thus, the carrier 10 can accommodate multiple bicycles in sequence across the arms 14a, 14b of support member 14, so that the frame of each bicycle can be supported at two distinct points. Although not shown, a clip or strap can be used to secure the bicycle frame within the V-shaped mounting assemblies 20 so that the bicycle does not come out of the channel when the vehicle V is moving. It should further be understood that although the figures show the mounting assemblies 20 having a V-shaped configuration in profile, the assemblies can have alternate shapes or design suitable for supporting a bicycle. In addition, it should be understood that arms 14a, 14b can be substantially identical to one another, or can alternatively have different lengths shapes or features.

FIGS. 1-3 show the arms 16a, 16b; 18a, 18b of additional support members 16, 18 each having a distal end featuring a removable hinged foot 22. As shown in FIG. 3, the foot 22 has a first end having a substantially flat surface 22b and a second end having a socket 22a for receiving the distal end of an arm of support members 16, 18. FIG. 3 shows the distal end of arms 16a, 18a having a tip with a projection 24. The size and shape of the projection 24 corresponds to size of the socket 22a such that the opposite ends of the projection 24 snap into recesses at each side of the socket 22a. When the foot 22 is engaged with the projection 24, the foot 22 is hingedly connected to the distal end of arms 16, 18, such that the foot can pivot about the tip. This configuration enables the foot to be adjusted so that flat surface 22b of the foot 22 can rest against a surface at the rear portion of a vehicle V in order to accommodate different vehicles and vehicle designs.

FIG. 3 shows the arms of the support members 14, 16, 18 each having a proximal end featuring an aperture 26a, 26b, 26c for receiving the shaft 12. The apertures 26a, 26b, 26c correspond in size and shape to the profile of the outer surface of the shaft 12, such that the arms of support members 14, 16, 18 can each slide along the length of the shaft 12 and can further slide onto or off of either end of the shaft 12. According to the embodiment shown in FIG. 3, the arms 14a, 14b of one set of support members 14 have an aperture 26a that is defined by an edge 27 having a grooved profile in cross-section which corresponds to the splined profile 13 of the shaft 12 such that the grooved profile and the splined profile 13 mate together in such a manner to prevent arms 14a, 14b from freely rotating around the shaft 12. The effect of this configuration is that, when mounted on the splined portion 13 of shaft 12, the arms 14a, 14b of one support member 14 are rotationally secured. The angular position, however, can be altered by sliding arms 14a, 14b off of the end of the shaft 12, rotating the arms 14a, 14b relative the shaft 12, and sliding the arms 14a, 14b back onto the locking position around the splined portion 13, but in a new rotational position. Alternatively, if shaft 12 has an unsplined region, arms 14a, 14b could be axially moved to that region, rotated as desired by the user, and then axially moved back to the splined region. It is understood that although FIG. 3 shows the arms 14a, 14b of one support member 14 as having the aperture 26a defined by the edge 27 having the grooved profile, the arms of any one of the other support members 16, 18 can alternatively have this configuration.

As shown in FIG. 3, apertures 26b, 26c on the arms of the remaining support members 16, 18 are not defined by an edge that is suitable for engaging the splined profile 13 of the shaft 12, and thus notwithstanding the splines, the arms 16a, 16b; 18a, 18b of these additional support members 16, 18 can rotate freely around the shaft 12, unless secured by other means as described herein. The effect of this configuration is that, when mounted to the shaft 12, the arms of support members 16, 18 can be rotationally adjusted to any angular position relative the one support member 14 that is rotationally secured to the shaft 12. It is important to note that since support members 16, 18 are engaged by shaft 12 but are not by themselves rotationally secured to the shaft 12, they can be rotationally adjusted without having to be removed from the shaft 12. Thus, according to the embodiment described above, and as shown in FIGS. 1-3, the arms 14a, 14b of only one support member 14 contain an aperture 26a that mates with the splined profile 13 of the shaft 12 and restricts rotational movement around the shaft 12. Arms 16a, 16b; 18a, 18b of the remaining support members, 16, 18 do not have such a grooved profile and can freely rotate around the shaft 12 unless secured by other means.

Preferably, the arms of each support member 14, 16, 18 additionally have a plurality of teeth 28 at their proximal end. As shown in FIG. 3, the plurality of teeth 28 extend axially from at least one lateral surface of each individual arm 14a, 16a, 18a. In the preferred embodiment, arms 14a, 14b of the one support member 14 that is rotationally secured around the splined portion 13 of the shaft 12, feature a plurality of teeth 28 extending axially from both opposing sides. Thus, for example when arm 14a is mounted onto the shaft, the teeth 28 at the proximal end of arm 14a can mate with corresponding teeth 28 from an adjacent arm 16a, 18a so that the arms can be locked together at the desired angular relationship. Teeth 28 are sized and spaced to allow small incremental rotational adjustment of the angular relationship between the support members 14, 16, 18. As shown in FIG. 3, teeth 28 are preferably arranged in an annular formation around the aperture 26a, 26b, 26c at the proximal end of each arm. In addition, as shown in FIG. 3, the second and third support members 16, 18 can each have a first arm 16a, 18a that are substantially identical to one another and a second arm 16b, 18b that are substantially identical to one another. Thus, the arms 16a, 18a can be interchanged, as can arms 16b, 18b.

As shown in FIGS. 1-3, the carrier 10 additionally features a plurality of collar assemblies 30 for keeping the teeth 28 of adjacent arms engaged with one another by preventing the arms from sliding along the length of the shaft 12. The collar assemblies 30 feature an outer surface, a body and a central aperture for receiving the shaft 12. The central aperture of the collar assemblies 30 corresponds in size and shape to the profile of the outer surface of the shaft 12 such that the collar assembly 30 can slide along the length of the shaft 12 and can further slide onto or off of either end of the shaft 12. Each collar assembly 30 additionally features at least one fastener 32, such as for example a threaded screw-type bolt, for securing the collar assembly 30 in a fixed position along the length of the shaft 12. The length of the fastener 32 is preferably greater than the thickness of the body of the collar assembly 30 such that the fastener 32 can extend entirely though the body of the collar assembly 30 from the outer surface into the central aperture. The fastener 32 can additionally feature a knob or handle that can be manually grasped in order to twist the fastener through the body of the collar assembly 30. As shown in FIG. 3, when a collar assembly 30 is placed in a desired location along the shaft 12, the fastener 32 is tightened down so that the tip of the fastener 32 engages the outer surface of the shaft 12. In this position, the collar assembly 30 is unable to slide laterally along the shaft 12. It should be understood, however, that other means for locking collar 30 in place axially can be used.

As shown in FIGS. 1-3, when mounted to the shaft 12, at least one arm of support members 14, 16, 18 is positioned beside and sandwiched between opposite collar assemblies 30. Both collar assemblies 30 at each end of the arms are positioned flush against the outermost arms 16, 18. Thus, when the opposing collar assemblies 32 on each side of the arms are axially secured to the shaft 12, the teeth 28 of adjacent arms cannot separate, and the arms are restricted from sliding along the length of the shaft 12. That is, these mechanisms constrain angular movement (via the interlocked teeth 28) and axial movement (via the fasteners 32).

In order to adjust the angular position of the respective support members 14, 16, 18, the fastener 32 of one of the collar assemblies 30 can be loosened from the shaft 12 so that the collar assembly 30 can slide away from the adjacent arm. The teeth 28 of adjacent arms can then be disengaged from one another so that the arms can be separated. Arms 16, 18 that are not rotationally secured to the shaft 12 can be rotated around the shaft 12 into the desired angular position relative one another. Once the desired position is achieved, the arms can be brought together again such that their respective teeth 28 mate with one another to lock the arms into a fixed angular position. The loosened collar assembly 30 is then slid back towards the arms until there is no space between the series of arms and the opposing collar assemblies 30. Once in this position, the fastener 32 can be tightened onto (or into an appropriate aperture in) the shaft 12 so that the arms and collar assembly 30 are secured into place.

As shown in FIGS. 1-3, the outer surface of the collar assemblies can have a fluted or scalloped configuration to facilitate the process of manipulating the collar assembly onto and off of the shaft 12. In addition, although not shown, one or more collar assemblies 30 may also have teeth substantially identical to the teeth 28 at the proximal end of each arm. Such teeth on the collar assembly 30 can axially extend around at least a portion of the body and can mate with the teeth 28 of one of the arms so that the collar assembly 30 and arm can be rotationally secured to one another. In addition, although the figures show collar assemblies 30 only at each end of a sequence of arms 14a, 16a, 18a, it should be understood that one or more additional intermediate collar assemblies 30 can be disposed between the arms 14a, 16a, 18a.

The present disclosure includes the material which is contained in the appended claims as well as that of the foregoing description. Although this invention has been described in its preferred form with a certain degree of particularity, it is to be understood that the present disclosure of the preferred form has been made only by way of example, and that numerous changes in the details of the elements, compositions and the combination of individual ingredients may be resorted to without departing from the novel spirit or scope of the invention. Indeed, the true measure of the scope of the present disclosure is defined by the appended claims including the full range of equivalents given to each element of each claim.

What is claimed is:

1. A bicycle carrier comprising:
   an elongated shaft having an outer surface having a splined profile along at least a portion of its length;
   a first support member removably mounted to the shaft, the first support member having at least one arm having opposing first and second sides and a proximal end having a first type of aperture suitable for receiving the shaft, the first type of aperture defined by an edge having a grooved profile in cross-section, the grooved profile being arranged for mating with the portion of the shaft having the splined profile, the proximal end of the at least one arm of the first support member having a plurality of teeth axially extending from both the opposing first and second sides;
   a plurality of additional support members removably mounted to the shaft and rotatable about the splined portion of the shaft, the plurality of additional support members each having at least one arm having opposing first and second sides and a proximal end with a second type of aperture suitable for receiving the shaft, the second type of aperture defined by an inner diameter larger than the splined profile for rotating about the splined profile, the proximal end of the at least one arm of the plurality of additional support members having a plurality of teeth axially extending from at least one of the opposing first or second sides;
   a plurality of collar assemblies removably mounted to the shaft, the collar assemblies having an outside surface, a body, a central aperture for receiving the shaft and a fastener extending through the body from the outside surface to the central aperture.

2. The bicycle carrier of claim 1 wherein the at least one arm of the first support member has at least one mount assembly suitable for accommodating a portion of a bicycle.

3. The bicycle carrier of claim 1 wherein the at least one arm of the plurality of additional support members has a distal end with a removably mounted hingedly connected foot pivotable about a tip at the distal end, the foot having a first end having a substantially flat surface and a second end having a socket for receiving the distal end of at least one arm of the plurality of additional support members.

4. The bicycle carrier of claim 1 wherein the first support member is comprised of two arms.

5. The bicycle carrier of claim 1 wherein the plurality of additional support members are comprised of second and third support members, each having a first and second arm.

6. The bicycle carrier of claim 2 wherein the at least one mount assembly mounted to the first support member has a generally V-shaped configuration forming a channel extending substantially parallel to the shaft.

7. The bicycle carrier of claim 4 wherein the two arms of the first support member are substantially identical to one another.

8. The bicycle carrier of claim 5 wherein the arms of the second and third support members each include an arcuate shape along their length.

9. The bicycle carrier of claim 5 wherein the first arm of the second support member is substantially identical to the first an of the third support member and a second arm of the second support member is substantially identical to the second arm of the third support member.

10. The bicycle carrier of claim 1 wherein the outer surface of the collar assemblies have a fluted configuration.

11. The bicycle carrier of claim 1 wherein only part of the shaft is splined.

12. A bicycle carrier comprising:
an elongated shaft having an outer surface with a splined profile along at least a portion of its length;
a first support member removably mounted to the shaft, the first support member having two arms having opposing first and second sides and a proximal end with a first type of aperture suitable for receiving the shaft, the first type of aperture defined by an edge having a grooved profile in cross-section, the grooved profile being arranged for mating with the portion of the shaft having the splined profile, the proximal end of the arms of the first support member having a plurality of teeth axially extending from both the opposing first and second sides;
second and third support members removably mounted to the shaft and rotatable about the splined portion of the shaft, the second and third support members each having two arms having opposing first and second sides and a proximal end with a second type of aperture suitable for receiving the shaft, the second type of aperture defined by an inner diameter larger than the splined profile for rotating about the splined profile, the proximal end of the arms of the second and third support members having a plurality of teeth axially extending from at least one of the opposing first or second sides;
a plurality of collar assemblies removably mounted to the shaft, the collar assemblies having an outside surface, a body, a central aperture for receiving the shaft and a fastener extending through the body from the outside surface to the central aperture.

13. The bicycle carrier of claim 12 wherein the arms of the first support member have at least one mount assembly suitable for accommodating a portion of a bicycle.

14. The bicycle carrier of claim 12 wherein the at arms of the second and third support members have a distal end with a removably mounted hingedly connected foot suitable for pivoting about the distal end, the foot having a first end having a substantially flat surface and a second end having a socket for receiving the distal end of an arm of the first or second support members.

15. The bicycle carrier of claim 13 wherein the at least one mount assembly of the arms of the first support member has a V-shaped configuration forming a channel extending substantially parallel to the shaft.

16. The bicycle carrier of claim 12 wherein the arms of the first support member are substantially identical to one another.

17. The bicycle carrier of claim 12 wherein the arms of the second and third support members each have an arcuate shape along their length.

18. The bicycle carrier of claim 12 wherein the arms of the second and third support members have a first arm with the plurality of teeth axially extending from the first side and a second arm with the plurality of teeth axially extending from the second side, the first arm of the second support member being substantially identical to the first arm of the third support member and a second arm of the second support member being substantially identical to the second arm of the third support member.

19. The bicycle carrier of claim 12 wherein the outer surface of the collar assemblies have a fluted configuration.

20. A bicycle carrier comprising:
an elongated shaft having an outer surface with a splined profile along at least a portion of its length;
first, second and third support members removably mounted to the shaft, the first, second and third support members each having at least one arm with opposing first and second sides and a proximal end with an aperture suitable for receiving the shaft, the aperture of the arm of the first support member defined by an edge having a grooved profile in cross-section, the grooved profile suitable for mating with the portion of the shaft having the splined profile, the proximal end of the arm of the first support member having a plurality of teeth axially extending from both the opposing first and second sides, the arm of the first member having a plurality of mount assemblies suitable for accommodating a portion of a plurality of bicycles, the arms of the second and third support members having a distal end with a removably mounted hingedly connected foot suitable for pivoting about the distal end, the foot having a first end having a substantially flat surface and a second end having a socket for receiving the distal end of at least one arm of the second or third support members, the arms of the second and third support members each having a first arm with a plurality of teeth extending from the first side at the proximal end and a second arm having a plurality of teeth extending from the second side at the proximal end, the aperture of the arms of the second and third support members defined by an inner diameter larger than the splined profile for rotating about the splined profile, the arms of the second and third support members being rotatable about the splined portion of the shaft, the first arm of the second support member being substantially identical to the first arm of the third support member and the second arm of the second support member being substantially identical to the second arm of the third support member;
a plurality of collar assemblies removably mounted to the shaft, the collar assemblies having an outside surface having a fluted configuration, a body, a central aperture for receiving the shaft and a fastener extending through the body from the outside surface into the central aperture.

21. A bicycle carrier for mounting on a vehicle exterior and for carrying one or more bicycles and comprising:
- a shaft having a plurality of axial splines positioned around at least a portion of an outside surface of the shaft and extending along at least a portion of the length of the shaft;
- a plurality of arms, each arm having an aperture to fit around the shaft;
- first and second arms of the plurality of arms having grooves inside their respective apertures and sized and configured to engage the splines on the shaft thereby to constrain angular movement of the first and second arms relative to the shaft, the aperture of at least third and fourth arms of the plurality of arms having an inner diameter larger than the splined profile for rotating the at least third and fourth arms about the plurality of splines;
- wherein the first and second arms each include at least one mounting cradles for engaging a portion of a bicycle to be carried;
- the at least third and fourth arms having teeth extending in the axial direction with respect to the shaft when the third and fourth arms are positioned on the shaft, the third and forth arms having distal ends with feet for abutting a surface of the vehicle;
- corresponding teeth on outer surfaces of the first and second arms, located around a periphery of the respective apertures and extending axially with respect to the shaft, the teeth of the third and fourth arms interlocking with the teeth of a first or second arm when such arms are moved into abutment with one another; and
- at least one locking collar having a central aperture to fit around the shaft, and having a locking mechanism to lock the collar into a fixed position axially along the shaft.

22. The bicycle carrier of claim 21 wherein the splines extend only partially along the axial length of the shaft.

23. The bicycle carrier of claim 21 wherein the shaft includes two sets of splines, the sets being spaced apart along the length of the shaft by an unsplined portion.

24. A method of operating a bicycle carrier for a vehicle comprising the steps of:
- setting an angular position of a first pair of spaced-apart arms, each arm having at least one mounting cradle for a bicycle, by moving the arms away from a splined area of a central shaft, selecting an angular position of the arms, and moving the arms into the splined area so that grooves on a surface of the first pair of arms engage splines on the splined area;
- setting angular positions of second and third pairs of rotatable arms by rotating the second and third pairs of rotatable arms about the splined area, the second and third pairs of arms having an aperture fitting around the splined area, the aperture having an inner diameter larger than the splined area diameter for enabling the rotation of the second and third pairs of arms about the splined area;
- moving the second and third pairs of rotatable arms into engagement with selected arms of the first pair of rotatable arms so that lateral engagement members on a surface of the second and third pairs of arms engage corresponding lateral engagement members on the first pair of arms; and
- locking the first, second and third pairs of arms in an axial position along the shaft thereby to prevent disengagement of the lateral engagement members so that such engagement members fix the angular position of the rotatable arms.

* * * * *